United States Patent Office 3,360,714
Patented Dec. 26, 1967

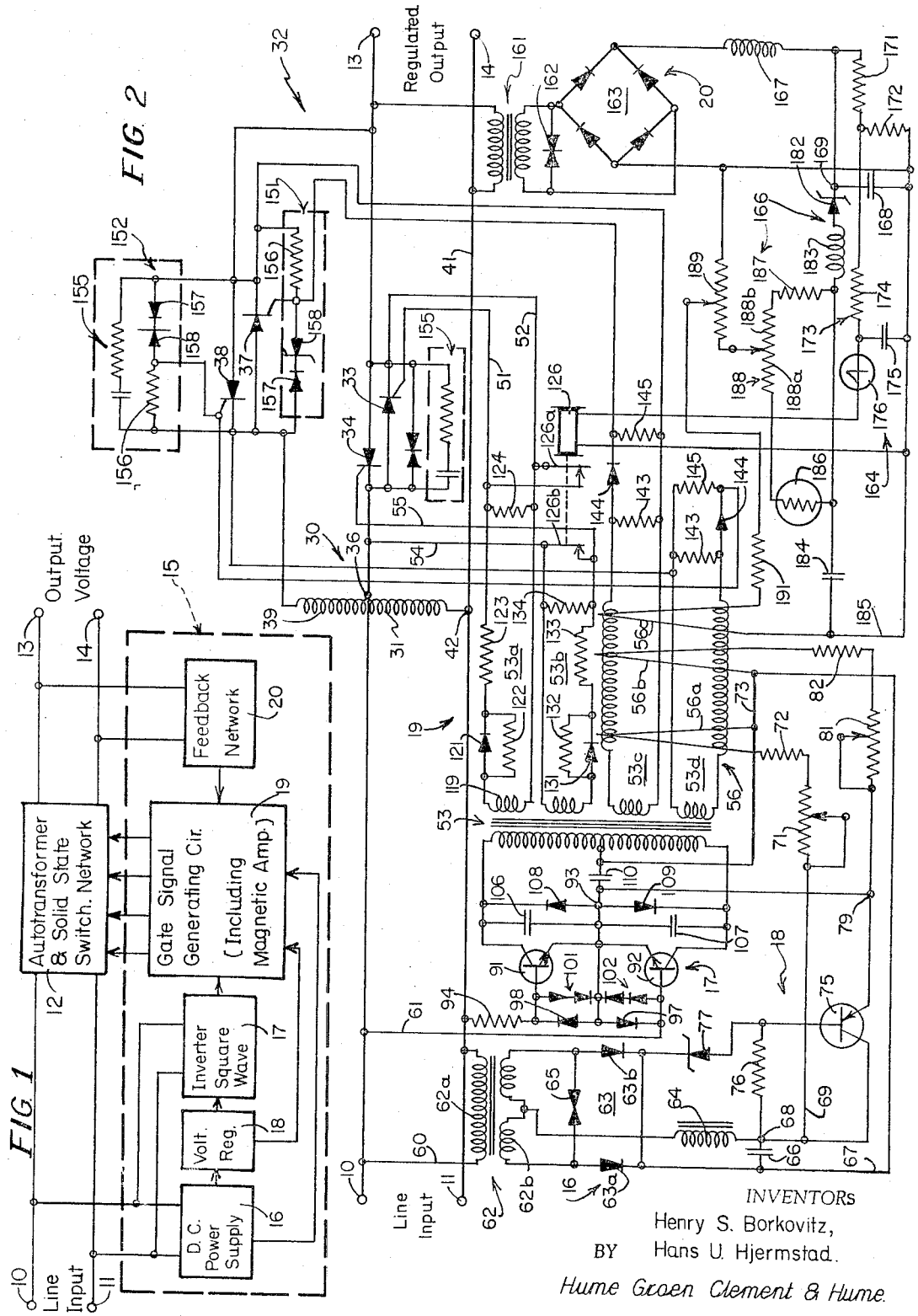

3,360,714
VOLTAGE REGULATOR HAVING OPEN AND CLOSED LOOP COMPENSATING MEANS
Henry S. Borkovitz and Hans U. Hjermstad, Chicago, Ill., assignors to Electro-Seal Corporation, Des Plaines, Ill., a corporation of Illinois
Filed June 8, 1964, Ser. No. 373,274
13 Claims. (Cl. 323—43.5)

ABSTRACT OF THE DISCLOSURE

A voltage regulator comprises an autotransformer having high and low voltage taps coupled to a load through a solid state switching network, the conductive state of the network determining the magnitude of the voltage applied to the load. A signal generating circuit nominally controls the conductive state of the network, but both an open loop and a closed loop compensating network are coupled to the signal generating circuit from respectively the input of the autotransformer and the output of the switching network to maintain a constant output voltage independent of variations in either the input voltage or the loading. Other features are also disclosed.

---

This invention relates to regulator circuits and more particularly to a voltage regulator which is capable of producing an accurately controlled output voltage notwithstanding input voltage and/or load variations.

It is an object of the present invention to provide a voltage regulator circuit that is capable of reliably producing an accurately controlled output voltage notwithstanding input voltage and/or load variations.

It is a further object of the present invention to provide a regulator circuit which employs both open and closed loop compensation in the control portion thereof so that a well regulated output voltage can be accurately and reliably produced by the circuit.

It is an additional object of the present invention to provide a voltage regulator circuit as set forth above, which regulator circuit responds to and compensates for input voltage and/or load variations within a time interval corresponding to the period of one cycle of the applied input signal so that a reliably and well regulated output voltage is produced thereby.

An additional object of the present invention is to provide an improved voltage regulator circuit that is highly sensitive and quickly responsive to output voltage variations, that is self protected for transient voltage surges in the circuit and/or ambient temperature variations, and that is relatively low cost both in construction and operation.

Other objects and advantages of the present invention will become apparent from the following detailed description of one preferred embodiment thereof, particularly when considered in conjunction with the accompanying drawing wherein:

FIGURE 1 is a simplified block diagram of a voltage regulator circuit embodying the principal features of the present invention; and FIGURE 2 is a detailed schematic of the regulator circuit depicted in FIGURE 1.

In general, the present invention is directed to a voltage regulator circuit wherein the line or input voltage is selectively supplied to a pair of output terminals (i.e. the load) through an autotransformer in response to the controlled operation of a switching network associated with the autotransformer. More particularly, a solid state switching network is employed in the secondary circuit of the autotransformer so that the actual output voltage derived therefrom at any given instant is dependent upon the state of the switching network. A control circuit is employed to selectively actuate the solid state switching network so that either the average or root mean square value of the output voltage is maintained substantially constant (i.e. within the limits of ±1%).

Referring to the drawing, FIGURE 1 illustrates the major components of a voltage regulator embodying the principal features of the present invention. As shown in this figure, a pair of input terminals 10 and 11 supply line or input voltage to a combined autotransformer and solid state switching network generally designated by the numeral 12. The output of the network 12 is connected to a pair of output or load terminals 13 and 14 whereacross a substantially constant and well regulated output voltage is developed in response to the selectively controlled operation of the autotransformer of the network 12. In this connection, a control circuit generally designated by the numeral 15 is utilized to selectively actuate the solid state switching circuit employed in the network 12 so that the voltage developed at the output terminals 13 and 14 has a substantially constant value.

As depicted in FIGURE 1, the control circuit 15 preferably includes a direct current power supply 16 that is connected across and receives line voltage from the input terminals 10 and 11. An inverter circuit 17 is preferably connected across the input terminals 10 and 11 so that the applied line voltage is supplied directly thereto.

The direct current power supply 16 preferably produces a filtered output voltage that is supplied to a voltage regulator circuit and to a gate signal generating circuit 19 that includes a magnetic amplifier. The output from the power supply 16 that is fed to the gate signal generating circuit 19 is actually fed to one of the control windings of the magnetic amplifier in the form of a biasing signal. In a similar manner, the voltage regulator 18 supplies a reference control signal to the magnetic amplifier of the circuit 19 and also feeds a regulated potential to the inverter circuit 17, the output of which feeds the gate signal generating circuit. A feedback network 20 is connected across the output of the network 12 and responds to output voltage variations by supplying still another signal to the gate signal generating circuit.

In particular, the feedback network 20 supplies a feedback control signal to the magnetic amplifier of the circuit 19. The circuit 19 responds to the various signals supplied thereto by selectively producing controlled gating signals that are fed to and control the operation of the network 12. In so responding, the circuit 19 produces output signals during each alternate half cycle of the applied line voltage such that the network 12 is rendered effective to maintain either a substantially constant average or root mean square value of output voltage across the terminals 13 and 14. This is accomplished by actuating the network 12 so that high and low voltage secondary circuits of the autotransformer supply the desired output voltage alternately and on a time proportioning basis. Specifically, during each half cycle of the applied line voltage, a low voltage secondary circuit of the autotransformer is initially connected to the output terminals 13 and 14. Then, at a later time in each half cycle, the network 12 is actuated by gating signals from the circuit 19 to connect a high voltage secondary circuit of the autotransformer to the output terminals. By selectively controlling the intervals during which the low and high voltage autotransformer secondary circuits are connected to the output terminals, a desired constant output voltage can be produced. Moreover, by adjusting such durations, effective compensation can be made for input voltage and/or load variations and the regulated output voltage can be maintained.

For example, any line voltage variation is immediately sensed by the direct current power supply 16. In response to such variation, the power supply 16 effects immediate "open loop" compensation therefor. That is, since the unregulated biasing signal developed by the power supply is fed directly to the circuit 19, the gating signal generation effected by this network will be varied within a time interval corresponding to the period of one cycle of the applied input signal. In this connection, the varied gating signal generation effected by the circuit 19 and by the magnetic amplifier employed therein will cause the switching intervals of the low and high voltage autotransformer secondary circuits to be adjusted so that the high voltage secondary is connected to the output terminals either earlier or later in the cycle depending upon the nature of the input voltage variation.

The feedback network 20 complements the open loop compensation effected by the unregulated biasing signal that is supplied to the circuit 19 from the direct current power supply 16. In this connection, when the output voltage from the network 12 manifests the variation in the applied input voltage, the feedback network 20 produces an error signal that further effects a compensating adjustment in the generation of gating signals by the circuit 19. In a similar manner, when load variations are reflected as deviations in the normal output voltage, the feedback network 20 responds to effect closed loop compensation for such variations. It will be appreciated that the control circuit 15 responds within a cycle to effect compensating variations in the output of the network 12 for any line voltage and/or load variations which would otherwise affect the production of a substantially constant output voltage.

FIGURE 2 schematically illustrates the more detailed features of a voltage regulator circuit constructed in accordance with the present invention. As shown, the input terminals 10 and 11 are connected to an autotransformer 30 and more particularly to a section 31 of the winding thereof. The output of the autotransformer 30 is selectively supplied to the terminals 13 and 14 through a solid state switching network 32.

More particularly, a first pair of parallelly connected silicon controlled rectifiers (i.e. SCR) 33 and 34 are connected between a low voltage tap 36 on the autotransformer winding and the output terminal 13. A second pair of silicon controlled rectifiers 37 and 38 are similarly parallelly connected between a high voltage tap 39 and the output terminal 13. A conductor 41 is connected to a common tap 42 on the autotransformer winding and to the other of the output terminals 14. The parallelly connected SCR switching circuits are preferably provided with suitable self gating and/or protective circuits, the function of which will be more fully hereinafter described.

From the circuit arrangement illustrated in FIGURE 2, it is apparent that the cathode-anode junction of the SCR 33 is properly biased for conduction during the positive half cycles of the applied input voltage (i.e. when the tap 36 is positive with respect to the tap 42). Similarly, the SCR 34 is conditioned to be rendered conductive during negative half cycles of the applied input voltage. Correspondingly, the SCR's 37 and 38 are properly biased on positive and negative half cycles of the applied input voltage, respectively, and these switching elements preclude the "low voltage" SCR's 33 and 34, respectively, from being rendered conductive when the "high voltage" SCR's are in a conductive state.

Pursuant to the present invention and under steady state conditions, the SCR's 33 and 34 are rendered conductive during the initial portion of the appropriate half cycles of applied input voltage. Accordingly, the output voltage supplied to the terminals 13 and 14 during the initial portion of each half cycle is derived from the low voltage tap 36. Thereafter, and in response to suitable gating signals being supplied from the control circuit 15, the rectifiers 37 and 38 are rendered conductive to (1) cut off the low voltage supply to the output terminals and (2) supply a higher output voltage component from the terminal 39 during the remaining portion of the appropriate cycle. Compensation for input voltage and/or load variations is effected by selectively varying the period of time during which the low voltage and high voltage tap switching SCR's are rendered conductive.

The conductive state of the various silicon controlled rectifiers 33, 34, 37 and 38 is dictated by the control circuit 15 and more particularly by the selective and controlled production of gating pulses by the circuit 19. In this connection, the cathode and gate electrodes of the SCR 33 are connected to the output of a first of a plurality of secondary circuits 53a of a multiple output gater transformer 53 through a pair of conductors 51 and 52. Similarly, the cathode and gate electrodes of the SCR 34 are connected to the output of another secondary circuit 53b through the conductors 54 and 55. The gate and cathode electrodes of the high voltage switching rectifiers 37 and 38 are similarly connected to secondary circuits 53c and 53d, respectively, of the transformer 53. As hereinafter described in detail, the secondary circuits 53a and 53b are wholly passive networks whereas the secondary circuits 53c and 53d include a magnetic amplifier 56, the controlled conductive state of which dictates the production of gating pulses by these circuits.

The line voltage that is applied to the autotransformer 30 and results in the development of the output potential that is supplied through the switching network 32 to the output terminals 13 and 14 is also supplied to the control circuit 15. In this connection, the input terminals 10 and 11 feed the line or input voltage to a pair of conductors 60 and 61 which, in turn, supply this voltage to the direct current power supply 16 and to the square wave inverter circuit 17.

More particularly, the conductor 60 supplies the line voltage to the primary 62a of a transformer 62 that constitutes the input to the power supply 16. As shown, the transformer 62 has a center tapped secondary winding 62b across which is connected an energy absorptive surge suppressor element 65 (i.e. a thyrector). The secondary winding 62b is connected to a full wave rectifier 63 formed by a pair of diodes 63a and 63b, and the output of the full wave rectifier includes a conventional L-section filter network formed by an inductor 64 and a capacitor 66.

The illustrated power supply circuit 16 is arranged so that a positive potential bearing conductor 67 serves as a common lead for other portions of the control circuit 15 and an output terminal 68 is provided whereat a filtered negative biasing potential is developed. The unregulated output of the full wave rectifier 63 (i.e. in the form of negative bias) is supplied to a biasing control winding 56a of the magnetic amplifier 56 employed in the gate signal generating circuit 19. That is, a path for current flow from the output terminal 68 to the winding 56a is defined by a conductor 69, a bias adjusting potentiometer 71 and a current limiting resistor 72. This path for current flow is completed by a conductor 73 which is connected directly to the conductor 67. The connection of the biasing winding 56a to the unregulated output terminal of the power supply 16 insures that the operation of the magnetic amplifier 56 is directly responsive to variations in the line voltage that is applied across the primary of the transformer 62.

The negative output terminal 68 of the full wave rectifier 63 is also connected directly to the collector of a PNP junction transistor 75 that functions as a conventional series regulator in the power supply 16. A biasing resistor 76 is connected between the terminal 68 and the base of the transistor 75, and a zener diode 77 is connected between the base of the transistor 75 and the common side of the rectifier 63 so that it functions as the control element for the series regulator. The regulated output signal from the emitter of the transistor 75 is supplied to an output terminal 79. As shown, a path for current flow from the terminal 79 to a reference control winding 56b of the magnetic amplifier 56 is provided by a reference signal adjusting potentiometer 81 and a current limiting resistor 82 that is connected in series with the potentiometer. This circuit is completed by a direct connection of the reference control winding 56b to the conductor 67.

The magnetic amplifier 56, which is preferably of the self-saturating type, also includes a feedback control winding 56c, to which a control signal is supplied from the feedback network 20 in the manner hereinafter more fully described. The control windings 56a, 56b and 56c are arranged and supplied with control signals so that the magnetic amplifier rapidly responds to line voltage and/or load variations and generates the necessary gating signals to compensate for such variations. To insure control over a wider phase angle range, the control circuit 15 employs the square wave inverter 17 to supply operating power to the transformer 53.

The square wave inverter 17 preferably employs a pair of NPN transistors 91 and 92, one of which is rendered conductive during each alternate half cycle of the applied input voltage. As shown, emitter bias for the transistors 91 and 92 is supplied to a conductor 93 from the regulator output terminal 79 so that a stable operating point is provided for the inverter circuit.

Referring more specifically to FIGURE 2, the base of the transistor 91 is connected to one of the input conductors through a current limiting resistor 94, while the base of the transistor 92 is connected directly to the conductor 61. A diode 97, which is connected between the conductor 93 and the base of the transistor 92, completes a path for emitter current from the transistor 91 when this transistor is in a conductive state (i.e. when the terminal 11 is positive with respect to the terminal 10). A semiconductor diode 98 is similarly connected between the conductor 93 and the base of the transistor 91 to complete a path for emitter current from the transistor 92 during its period of conduction.

In a conventional manner, the transistors 91 and 92 are alternately rendered conductive to produce a square wave output voltage across the primary of the multiple output gater transformer 53. To insure that the transistors 91 and 92 are turned on early in each cycle of the applied input voltage, which improves the characteristics of the square wave produced thereby, the current limiting resistor 94 is selected to have a somewhat lower value than might normally be employed.

A diode pair 101 is connected across the base-emitter junction of the transistor 91, and a similar diode pair 102 is connected across the base-emitter junction of the transistor 92. The appropriate one of these diode pairs is rendered conductive as a peak voltage condition is reached during each half cycle of the applied line voltage thereby isolating the transistors 91 and 92 from this condition and prolonging the operational life thereof.

In addition to the center tapped primary winding of the transformer 53, the output circuits of the transistors 91 and 92 include means for effecting noise suppression in the developed square wave voltage as well as means for precluding energy stored in the primary of the transformer from being fed back to the line after the transistors 91 and 92 are cutoff. In this connection, a noise filtering capacitor 106 is connected across the collector-emitter junction of the transistor 91, and a capacitor 107 is similarly provided across the collector-emitter junction of the transistor 92. A semiconductor diode 108 is connected in parallel with the capacitor 106, and a diode 109 is connected between the conductor 93 and the collector of the transistor 92 in parallel with the capacitor 107. The diodes 108 and 109 function in conjunction with a capacitor 110 that is connected between the conductor 93 and the center tap of the primary winding of the transformer 53 to form a conventional backswing clipper circuit for the primary of the transformer 53.

From the foregoing, it will be appreciated that the output from the square wave inverter 17 provides a suitable driving signal for the gate signal generating circuit 19. In this connection, the square wave output voltage produced by the inverter circuit 17 and supplied by the transformer 53 to the secondary circuits 53a, 53b, 53c and 53d results in these circuits being rendered effective to produce gating pulses that effect the actuation of the SCR's 33, 34, 37 and 38.

More particularly, the secondary circuit 53a includes a secondary winding 119 that supplies potential to a passive network formed by a parallelly connected semiconductor diode 121 and biasing resistor 122, a series load resistor 123 and a parallel load resistor 124. The output from this passive network is supplied to the conductors 51 and 52 which, as previously described, are connected to the gate and cathode electrodes respectively of the silicon controlled rectifier 33. The secondary circuit 53a is shunted by a normally closed starting relay contact 126a that is connected between the conductors 51 and 52. As hereinafter described in detail, the contact 126a is actuated in response to the energization of a starting relay 126 (i.e. in the feedback network 20) after the regulator has been initially turned on and subsequent to the passage of a preselected interval of time.

The secondary circuit 53b is substantially identical to the circuit 53a and includes a parallelly connected semiconductor diode 131 and biasing resistor 132 as well as a series load resistor 133 and a parallel load resistor 134. This secondary circuit is similarly shunted by a normally closed relay contact 126b of the starting relay 126.

Assuming steady state conditions (i.e. subsequent to the energization of the starting relay), gating pulse generation is effected by the secondary circuit 53a during the initial portion of each positive half cycle of the square wave voltage derived from the inverter circuit 17. That is, when the upper tap on the winding 119 is positive with respect to the lower tap, the semiconductor diode 121 is forward biased to allow current to flow through the load resistors 123 and 124. The resulting voltage developed across the resistor 124 renders the gate electrode of the rectifier 33 positive with respect to the cathode electrode thereof and the rectifier is thereby rendered conductive.

The resistor 123 is employed to limit the maximum current drawn from the secondary winding 119 while the resistor 124 functions to insure that at least a minimum amount of current is drawn by the secondary. As a result, a substantially constant load is established across this transformer secondary. The resistor 122 provides a path for a small "negative signal current" so that the SCR 33 is negatively biased in an ungated condition during negative half cycles of the applied input voltage.

It will be appreciated that the operation of the secondary circuit 53b is essentially the same as that of the circuit 53a. However, gating pulses are produced by this circuit during the negative half cycles of the square wave voltage developed across the primary winding 53, and these pulses effect the selective gating of the SCR 34.

In a somewhat similar manner but under the control of the magnetic amplifier 56, the secondary circuits 53c and 53d effect the production of gating pulses for the high voltage tap selecting SCR's 37 and 38. As shown, the output of each of these circuits includes a pi-type network formed by a biasing resistor 143, a diode 144 and a load resistor 145. During the appropriate half cycles of the applied square wave voltage and with the magnetic amplifier in its controlled state of saturation (i.e. fully on), current will flow in these secondary circuits thereby resulting in a voltage being developed across the corresponding load resistor 145. This voltage will gate the appropriate one of the SCR's 37 or 38 into a state of conduction.

When the state of the magnetic amplifier is such that the SCR's 37 and 38 are not to be rendered conductive, the resistor 143 and diode 144 of each of the secondary circuits 53c and 59d come into play and compensate for any leakage current in these circuits thereby precluding the possibility of a premature gating of these rectifiers. In this connection, the resistor 143 provides a path for leakage current in each of these secondary circuits and the associated diode 144 functions to subtract any leakage voltage from the output thereof. It will be appreciated that the resistor 145 also provides a path for leakage current so that a small leakage voltage is developed thereacross. However, because of the diode 144, the leakage voltage developed across the resistor 145 is not sufficient to gate the corresponding low voltage SCR into a conductive state.

As generally outlined above, the high voltage tap switching SCR's 37 and 38 employ suitable self gating networks that are designated by the numerals 151 and 152. These self gating networks perform the protective function of passing any voltage spikes through the high voltage output circuit so that the smallest possible current is shunted through the switching network 32. Each of the dual rectifier, high and low voltage tap selecting switching circuits of the network 32 is also provided with a R-C network 155 that functions as a conventional protective limiter on the rate of voltage rise across these circuits.

It is important to preclude the occurrence of circulating currents in the secondary winding of the autotransformer 30. Accordingly, the low voltage tap switching rectifiers 33 and 34 are initially precluded from being gated into a conductive condition by short circuiting the output of the secondary circuits 53a and 53b with the relay contacts 126a and 126b. Accordingly, the initial period of operation of the regulator is under the control of the high voltage SCR's 37 and 38, the conductive state of which is in turn controlled by the magnetic amplifier 56.

After an initial preselected period of operation as controlled by the SCR's 37 and 38, the normal operational state of the regulator (i.e. when the rectifiers 33, 34, 37 and 38 are alternately conducting on a controlled time proportioning basis) is established. This occurs in response to the feedback network 20 being rendered effective to energize the starting relay 126. In this connection, the input to the feedback network 20 includes a transformer 161 that is connected across the output coductors of the regulator. In a conventional manner, the secondary of the transformer is shunted by a voltage surge suppressing thyrector 162, and the output of this transformer is supplied to a conventional full wave bridge rectifier 163. The output of the full wave rectifier 163 is fed to a starting circuit 164 that controls the energization of the starting relay 126 and to a temperature compensated, gain boosting circuit 166 that supplies the necessary control signal to the feedback winding 56c of the magnetic amplifier 56.

More particularly, the output from the full wave rectifier 163 is fed through an L-section filter circuit including an inductor 167 and a capacitor 168, and the filtered output voltage is developed at a junction designated by the numeral 169. The voltage at the junction 169 is fed through a voltage divider including a pair of resistors 171 and 172. The voltage developed across the resistor 172 is fed to a timing network 173 including a resistor 174, a capacitor 175 and a four-layer diode 176. The voltage developed across the capacitor 175 in response to the charging thereof is applied to the normally nonconductive diode 176. When the diode 176 is rendered conductive the starting relay 126, which is connected in series therewith, is energized.

It will be appreciated that the parameters of the timing network 173 are preferably selected so that the diode 176 is rendered conductive and the relay 126 energized a relatively short period of time after the line voltage is initially supplied to the input terminals 10 and 11. This insures that the regulating characteristics of the entire circuit come into play substantially immediatelly while at the same time the regulator components are protected against adverse circuit conditions that might occur when line voltage is initially supplied thereto.

As previously set forth, the feedback signal generating circuit 166 supplies closed loop compensation for the regulator. In this connection, undesirable deviations in the output voltage are responded to rapidly by the circuit 166 and with optimmum gain so that compensation is effected for such variations in a reliable and efficient manner.

As shown in FIGURE 2, the input to the feedback signal generating circuit 166 includes a Zener diode 182 that is connected to the junction 169 and in series with a filter choke 183 which in conjunction with a capacitor 184 comprises a conventional filter network.

The filter capacitor 184 is connected in parallel with the gain adjusting and temperature compensating portions of the circuit that include a thermistor 186, a resistor 187, a pair of adjustable voltage dividers 188 (i.e. a temperature compensating voltage divider) and 189 (i.e. a gain adjusting voltage divider), and a current limiting resistor 191. The thermistor 186 and a segment 188a of the voltage divider 188 are connected in parallel with the resistor 187 and the other portion 188b of the voltage divider. The adjustable tap on the voltage divider 188 is connected to the common side of the bridge network 163 through the gain adjusting voltage divider 189. The current limiting resistor 191 and the feedback winding 56c of the magnetic amplifier are in turn connected between the adjustable tap on the gain adjusting voltage divider 189 and the conductor 185.

The reliable operation of the feedback signal generating circuit 166 stems in substantial part from the gain boosting function effected by the Zener diode 182. In this connection, the Zener diode 182 has a substantially constant voltage developed thereacross under constant temperature conditions. As a result, the voltage actually applied to the remaining series parallel arrangement of components including the voltage dividers 188 and 189 is of diminished magnitude.

Although a voltage deviation reflected in the output of the bridge network 163 may be relatively small in comparison to the voltage produced by this bridge network, this deviation is clearly reflected when applied to the temperature compensating and gain adjusting portions of the circuit 166. Consequently, although a small variation in voltage occurs at the output of the regulator, this variation will be sensed and reliably responded to by the circuit 166 so that the desired feedback signal is supplied to the feedback winding 56c.

The thermistor 186 in the temperature compensating portion of the circuit 166 has a characteristic such that the resistance of this element decreases as temperature increases. On the other hand, the Zener diode 182 is selected so that the voltage drop across this element increases as temperature increases. Because of these complementary characteristics of the thermistor and Zener diode, the sensitivity of the circuit 166 is maintained notwithstanding temperature variations.

Having considered the more detailed features of a preferred embodiment of a regulator constructed in accordance with the present invention, it will be well to briefly review the operating characteristics of this regulator as specifically applied to FIGURE 2. More particularly and under steady state conditions, the magnetic amplifier 56 has signals supplied to each of its windings 56a, 56b and 56c such that the low voltage tap selecting rectifiers 33 and 34 are rendered conductive during the initial portion of each half cycle of the applied line voltage.

Thereafter, the signals supplied to the feedback and biasing windings trigger the magnetic amplifier into a saturated state of conduction such that the appropriate high voltage tap selecting rectifier 37 or 38 is rendered conductive during the remaining portion of the half cycle.

If a preselected output voltage condition is maintained and in the absence of input voltage and/or load variations, the cyclic operation of the regulator continues with the selective gating of the high voltage tap selecting rectifiers being dictated by the magnetic amplifier 56.

When a condition occurs which tends to cause a deviation in the output voltage from its preselected regulated value, the control circuit 15 responds by producing signals that are supplied to either or both the biasing and feedback windings 56a and 56c. As a result, the high voltage rectifiers are gated on either earlier or later in that particular half cycle to compensate for the deviation that tends to be created by the adverse conditions.

From the foregoing, it will be appreciated that the present invention provides an improved regulator circuit that is capable of reliably effecting the production of a substantially constant average output voltage component across the terminals 13 and 14. The circuit is not only capable of responding within a cycle to effect compensation for input voltage and/or load variations, but it also includes suitable means for protecting the various components employed in the regulator. For example, by employing the starting circuit as described above, a steady state condition is achieved without subjecting the switching network 32 to the adverse effects possibly incident to the application of the line voltage to the regulator, and circulating currents are precluded from being developed in the switching network.

It should be understood that the foregoing is merely illustrative of the invention. For example, it would be obvious to one skilled in the art to make minor variations in the regulator in order to render it capable of producing a substantially constant RMS output voltage component across the terminals 13 and 14. Other modifications of the illustrated circuit might be effected by one skilled in the art without departing from the invention, various features of which are set forth in the accompanying claims.

What is claimed is:

1. A voltage regulator for supplying a substantially constant output voltage from a source to a load connected across the output terminals of the regulator; which voltage regulator comprises an autotransformer connected to the source and having high and low voltage output taps; a solid state switching network connected between said high and low voltage output taps of said autotransformer and the output terminals of the regulator so that the output voltage supplied to the terminals from said autotransformer is dictated by the conductive state of said switching network; a signal generating circuit connected to said solid state switching network for selectively controlling the conductive state thereof; open loop compensating means connected between said autotransformer and said signal generating circuit for developing first control signals in direct response to input voltage variations and for supplying said control signals to said signal generating circuit; and closed loop compensating means connected between the output of said switching network and said signal generating circuit for supplying second control signals to said signal generating circuit; said first and second control signals actuating said signal generating circuit to selectively render said switching network conductive so that a substantially constant output voltage is derived from said autotransformer notwithstanding either input voltage and load variations.

2. The combination according to claim 1 in which said switching network includes a first switching means for deriving voltage from said low voltage output tap and a second switching means for deriving voltage from said high voltage output tap and in which said signal generating circuit renders said first and second switching means conductive on a time proportioning basis.

3. The combination according to claim 2 in which said signal generating circuit includes an inverter synchronized with said source voltage for developing a plurality of triggering signals having a predetermined phase relation to said source voltage.

4. The combination according to claim 3 in which conduction of said second switching means renders said first switching means inoperative.

5. The combination according to claim 4 in which said signal generating network further includes a signal combining network for effectively adding said first and second control signals and predetermined ones of said plurality of triggering signals to develop net triggering signals for application to said second switching means.

6. The combination according to claim 5 in which said first and second switching means each comprise a pair of oppositely poled silicon controlled rectifiers with said first pair of controlled rectifiers having respective control electrodes coupled to said signal generating circuit for each receiving a respective one of said plurality of triggering signals and with said second pair of silicon controlled rectifiers having respective control electrodes coupled to said signal combining network for receiving a respective one of said net triggering signals.

7. The combination according to claim 6 in which said inverter develops two triggering signal pairs, all of said triggering signals being of like frequency but the signals of each pair being of opposite phase.

8. The combination according to claim 7 and further including an adjustable bias source and in which said combining network comprises a magnetic amplifier having a pair of input windings coupled to receive respective ones of said pair of triggering signals and a pair of output windings coupled to respective control electrodes of said second controlled rectifier pair and further having three control windings with two of said windings coupled to respectively receive said first and second control signals and with said third winding coupled to said adjustable bias source.

9. The combination according to claim 8 and further including a starting circuit connected to said closed loop compensating means for precluding said first pair of silicon control rectifiers from being rendered conductive for a preselected period of time after an input voltage is initially applied to said autotransformer input circuit.

10. The combination according to claim 9 in which said closed loop compensating means includes a full-wave rectifier for developing a DC control signal proportional in amplitude to the instantaneous value of said output voltage.

11. The combination according to claim 10 in which said starting circuit includes a relay, the actuation of which conditions said first pair of controlled rectifiers for conduction and further including a resistor-capacitor timing network coupled between said full-wave rectifier and said relay for delaying actuation of relay for said preselected period of time after voltage is applied to said load.

12. The combination according to claim 11 in which said closed loop compensating means includes a zener diode developing thereacross a substantially constant DC voltage for effectively increasing the magnitude of any variation in said output voltage relative to a total DC voltage value.

13. A voltage regulator for supplying a substantially constant output voltage from a source to a load connected across the output terminals of the regulator; which voltage regulator comprises an autotransformer connected to the source and having high and low voltage output taps; switching means connected between said high and low voltage output taps of said autotransformer and the output terminals of the regulator so that the output voltage supplied to the terminals from said autotransformer is dictated by the conductive state of said switching means; a signal generating circuit connected to said switching means for selectively controlling the conductive state thereof; open loop compensating means connected between said autotransformer and said signal generating circuit for developing first control signals in direct response to input voltage variations and for supplying said first control signals to said signal generating circuit; and closed loop compensating means connected between the output of said switching means and said signal generating circuit for supplying second control signals to said signal generating circuit; said first and second control signals actuating said signal generating circuit to selectively render said switching means conductive so that a substantially constant output voltage is derived from said autotransformer notwithstanding either input voltage and load variations.

References Cited

UNITED STATES PATENTS

| | | | |
|---|---|---|---|
| 1,947,292 | 2/1934 | Garman | 323—43.5 |
| 3,040,239 | 6/1962 | Walker | 323—43.5 X |
| 3,263,157 | 7/1966 | Klein | 323—43.5 X |
| 3,275,889 | 9/1966 | Sharp et al. | 317—14 |
| 3,275,929 | 9/1966 | Schatz | 323—43.5 |
| 3,281,652 | 10/1966 | Perrins | 323—43.5 X |

JOHN F. COUCH, *Primary Examiner.*

A. D. PELLINEN, *Assistant Examiner.*